(12) United States Patent
Sullivan

(10) Patent No.: US 6,658,598 B1
(45) Date of Patent: *Dec. 2, 2003

(54) TECHNICAL SUPPORT CHAIN AUTOMATION WITH GUIDED SELF-HELP CAPABILITY USING ACTIVE CONTENT ASSERTIONS

(75) Inventor: Francis X. Sullivan, Round Rock, TX (US)

(73) Assignee: Motive Communications, Inc., Austin, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/505,502

(22) Filed: Feb. 17, 2000

(51) Int. Cl.[7] .................................................. G06F 11/00
(52) U.S. Cl. ........................................................ 714/25
(58) Field of Search ............................. 714/25, 26, 31, 714/46, 57

(56) References Cited

U.S. PATENT DOCUMENTS

| | | | |
|---|---|---|---|
| 5,107,500 A | | 4/1992 | Wakamoto et al. ......... 371/15.1 |
| 5,581,664 A | | 12/1996 | Allen et al. .................... 706/11 |
| 5,664,093 A | * | 9/1997 | Barnett ......................... 714/31 |
| 5,678,002 A | * | 10/1997 | Fawcett . ..................... 345/336 |
| 5,701,399 A | | 12/1997 | Lee et al. ...................... 706/11 |
| 5,742,773 A | | 4/1998 | Blomfield-Brown et al. .......... 395/200.58 |
| 5,754,766 A | | 5/1998 | Shaw et al. ............... 395/200.3 |
| 5,787,234 A | | 7/1998 | Molloy ........................ 706/46 |
| 5,790,780 A | * | 8/1998 | Brichta ........................ 714/46 |
| 5,878,415 A | | 3/1999 | Olds ............................. 707/9 |
| 5,908,383 A | * | 6/1999 | Brynjestad .................. 600/300 |
| 5,918,004 A | | 6/1999 | Anderson et al. ...... 395/183.14 |
| 5,926,624 A | | 7/1999 | Katz et al. ............. 395/200.47 |
| 5,941,947 A | | 8/1999 | Brown et al. ................ 709/225 |
| 5,944,839 A | * | 8/1999 | Isenberg ...................... 714/26 |

(List continued on next page.)

OTHER PUBLICATIONS

SystemWizard™–The End–to–End Solution, Website dated 1998, 10 pages.*
Soft Letter & The Association of Support Professionals, The Year's Ten Best Web Support Sites, 1998, 10 pages.
Replicase, Inc., Self–Healing System 1.0, 1998, pp. 1–10.
Full Circle Software, Inc., Talkback Whitepaper, Jul. 1998, pp. 1–7.
Cybermedia, First Aid, Oct. 1998, pp. 1–6.
Aveo, The Attune System, Oct. 1998, pp. 1–6.

*Primary Examiner*—Robert Beausoliel
*Assistant Examiner*—Bryce P. Bonzo
(74) *Attorney, Agent, or Firm*—Campbell Stephenson Ascolese LLP; D'Ann Naylor Rifai

(57) ABSTRACT

Guided self-help is facilitated through use of so-called "active content" pages that are selectively filtered and retrieved as a function of a set of declarative "assertions." An assertion typically is an individual statement or building block of a larger, more comprehensive diagnostic map. An assertions map is a smaller, more focused version of a diagnostic map that is executed against a user's computer system to diagnose a particular problem situation that the user has encountered. When a user encounters a technical problem, he or she navigates to a search window and enables a given command when entering a search string to identify fixes for the problem. A server process responds to the search request and downloads an assertions map that checks the state of the end user system and returns results. The server process then processes the conditions, filters content that matches conditions on the end user system, and ranks and displays search results to the relevant active content based on a hierarchy of assertion results.

24 Claims, 12 Drawing Sheets

U.S. PATENT DOCUMENTS

| | | | |
|---|---|---|---|
| 5,983,234 A | 11/1999 | Tietjen et al. | 707/103 |
| 5,983,364 A | 11/1999 | Bortcosh et al. | 714/25 |
| 5,983,369 A | 11/1999 | Bakoglu et al. | 714/46 |
| 5,992,737 A | 11/1999 | Kubota | 235/380 |
| 5,994,032 A | 11/1999 | Goffing et al. | 430/307 |
| 5,995,956 A | 11/1999 | Nguyen | 706/54 |
| 6,014,651 A | 1/2000 | Crawford | 705/400 |
| 6,026,500 A | 2/2000 | Topff et al. | 714/26 |
| 6,041,323 A | 3/2000 | Kubota | 707/5 |
| 6,145,096 A * | 11/2000 | Bereiter | 714/25 |
| 6,167,395 A | 12/2000 | Beck et al. | 707/3 |
| 6,170,011 B1 | 1/2001 | Macleod Beck et al. | 709/224 |
| 6,170,065 B1 * | 1/2001 | Kobata | 714/7 |
| 6,177,932 B1 | 1/2001 | Galdes et al. | 345/329 |
| 6,185,606 B1 | 2/2001 | Bereiter | 709/206 |
| 6,195,426 B1 | 2/2001 | Bolduc et al. | 379/266 |
| 6,195,666 B1 | 2/2001 | Schneck et al. | 707/513 |
| 6,195,763 B1 * | 2/2001 | Mayer | 714/25 |
| 6,205,579 B1 | 3/2001 | Southgate | 717/11 |
| 6,219,667 B1 | 4/2001 | Lu et al. | 707/9 |
| 6,219,719 B1 * | 4/2001 | Graf | 710/1 |
| 6,230,287 B1 * | 5/2001 | Pinard | 714/31 |
| 6,236,989 B1 | 5/2001 | Mandyam et al. | 707/4 |
| 6,237,114 B1 * | 5/2001 | Wookey | 714/47 |
| 6,240,420 B1 | 5/2001 | Lee | 707/102 |
| 6,256,620 B1 | 7/2001 | Jawahar et al. | 707/2 |
| 6,260,048 B1 | 7/2001 | Carpenter et al. | 707/104 |
| 6,279,125 B1 | 8/2001 | Klein | 714/38 |
| 6,298,457 B1 | 10/2001 | Rachlin et al. | 714/49 |
| 6,321,348 B1 | 11/2001 | Kobata | 714/37 |

* cited by examiner

MOTIVE COMMUNICATIONS
FIRST IN SUPPORT CHAIN AUTOMATION

Enter your query below:

[Search String] ~90    [Search] ~88    Tips for searching

☐ Use Free-Text Query.

Alerts and Late-Breaking Information
- 📄 *Alert* - alert

Current Category: ☐ *top*

SubCategories:
- ☐ *comp*
- ☐ *jdirect*
- ☐ *Duke's*
- ☐ *Bill's*
- ☐ *Jeremy*
- ☐ *Mike's*
- ☐ *sanjay*
- ☐ *enrico*
- ☐ *Corey*
- ☐ *Category*
- ☐ *testing*
- ☐ *Self Help*
- ☐ *This is a test*
- ☐ *Test Cat*
- ☐ *Jerry*
- ☐ *Omar*
- ☐ *Solaris*
- ☐ *Outlook Express*
- ☐ *New Category*

Active Content for the Current Category
- 📄 *FAQ* - nbn
- ☐ *Release Note* - Test Release Note
- 📄 *Support Note* - Guided support for Outlook Express
- ☐ *FAQ* - New FAQ

91

©1997-1998 Motive Communications. None of the text or images on this page may be reproduced without the express written consent of Motive Communications. All rights reserved.

*FIG. 7*

MOTIVE COMMUNICATIONS
FIRST IN SUPPORT CHAIN AUTOMATION

💡 *Support Note:*
*Wrong Wwintl32.dll Error*

Problem

*The information in this article applies to:*

• *Microsoft Word 97 for Windows, Service Release 1(SR-1)*

*SYMPTOMS: When you attempt to start Microsoft Word after you have run the Microsoft Office97 Service Release1 (SR-1) Patch, you may receive the following error message.*

*The wrong WWINTL32.DLL has been loaded.*

*CAUSE: This error message occurs when the versions of the Winword.exe file and the Wwintl32.dll file are not the same.*

*NOTE: It is not sufficient to check the file version information that is displayed when you right-click the program icon and click Properties on the shortcut menu.*
*This problem may also occur if a wwintl32.dll file is located in the Windows\System directory.*

Solution

 *Fix*

*When you install the SR-1 Patch, the Winword.exe or the Wwintl32.dll files are not properly updated. Select the Motive Fixit icon lower to resolve this problem. More Background: The following table shows the file size and date of the Winword.exe file installed by Word 97 or the Word 97 SR-1 Patch.*

| Version | File size | Date |
|---|---|---|
| Word 97 | 5194 KB | 11/17/96 |
| Word 97 SR-1 Patch | 5200 KB | 7/11/97 |

*The default location for the Winword.exe is the C:\Program Files\Microsoft Office\Office folder.*

*The following table shows the file size, date and location of the Wwintl32.dll file installed by Word 97 and the Word 97 SR-1 Patch.*

| Version | File size | Date |
|---|---|---|
| Word 97 | 1131 KB | 11/17/96 |
| Word 97 SR-1 Patch | 1132 KB | 7/11/97 |

*The Default location for the Wwintl32.dll file is the following:*
*C:\Program Files\Microsoft Office\Office*

FIG. 9

Motive Self Help Results Page

Page 1 of 1

MOTIVE COMMUNICATIONS
FIRST IN SUPPORT CHAIN AUTOMATION

Active Self-Service Results

You have this problem. The version of the installed library Wwintl32.dll is not correct. Select the fixit diagnostic to resolve this issue.

Related Links

This Motive diagnostic session suggested the following related links:

<u>Main Microsoft Office Site</u>

Related Information

This Motive diagnostic session suggested some hints that should turn up some relevant related information. Click on the View Related Information button if you want to view this related information.

| View Related Information |

Need Live Help? Since answers to many known problems can be found here, we encourage you to continue using our self-service system. However, if you are not able to locate the answer to your problems, and want to work with a live support engineer, click <u>here</u>, and someone will help you as soon as possible.

FIG. 10

Motive Self Help Results Page

MOTIVE COMMUNICATIONS
FIRST IN SUPPORT CHAIN AUTOMATION

Active Self-Service Results

The version of the installed library Wwintl32.dll has been updated.
You should be able to use Microsoft Word for Windows now.

Related Links

- This Motive diagnostic session suggested the following related links:

Main Microsoft Office Site

Related Information

This Motive diagnostic session suggested some hints that should turn up some relevant related information. Click on the View Related Information button if you want to view this related information

[ View Related Information ]

Need Live Help? Since answers to many known problems can be found here, we encourage you to continue using our self-service system. However, if you are not able to locate the answer to your problems, and want to work with a live support engineer, click here, and someone will help you as soon as possible.

*FIG. 11*

TECHNICAL SUPPORT CHAIN AUTOMATION WITH GUIDED SELF-HELP CAPABILITY USING ACTIVE CONTENT ASSERTIONS

Portions of this patent application contain materials that are subject to copyright protection. The copyright owner has no objection to the facsimile reproduction by anyone of the patent document, or:the patent disclosure, as it appears in the Patent and Trademark Office file or records, but otherwise reserves all copyright rights whatsoever.

RELATED APPLICATIONS

This application is related to U.S. Ser. No. 09/073,464, filed May 6, 1998, titled "Method, System and Computer-Program Product for Iterative Distributed Problem Solving"; and U.S. Ser. No. 09/216,212, filed Dec. 18, 1998, titled "Technical Support Chain Automation with Guided Self-Help Capability Using Active Content."

BACKGROUND OF THE INVENTION

1. Technical Field

The present invention relates generally to automated customer support and service in a distributed computing environment and more particularly to a method of reducing a number of "live" support calls by providing intelligent, guided self-help in such an environment.

2. Description of the Related Art

Technical support services and programs are designed to diagnose and solve hardware or software problems that users and/or customers encounter as they use computers. As businesses continue to move on-line, distributed computing environments become more complex and, thus, more difficult to troubleshoot. Indeed, entire businesses now desire to connect their critical business systems directly to employees, customers, vendors and other important constituencies. To this end, many internal or external business network applications are now being connected to the Internet's World Wide Web to make the information accessible from anywhere using conventional browser software.

Traditional technical support centers place their emphasis on internal tracking and productivity tools, such as problem tracking systems. Such "back end" systems exist internally to the support organization and are usually transparent to the customer. Although back-end systems aid internal efficiency, they do little for the actual problem resolution process itself. Problem resolution is typically left to telephony-based technologies such as agent-based automatic call distribution (ACD) support centers and intelligent voice response (IVR) devices.

Such techniques attempt to diagnose and address problems on a remote node without actually having the technician travel to that node. The most common method of technical support is still a telephone conversation with tech support personnel. Other known techniques involve a network "login" to the remote node so that the conditions may be evaluated from the technical support center's viewpoint. The network connection may be used to run a diagnostic program on the remote node, or "self-help" fix-it programs may. be downloaded to the remote note and executed there.

With the explosive growth of the Internet, yet another approach has become quite popular. This approach involves having the user access a Web server with support content in the form of support notes or FAQs. The user attempts to use this information to "self service" his or her own problem. On its face, this strategy appears sensible as, theoretically, an effective self-service strategy would let users solve problems for themselves (e.g., through a Web browser), with the result of lower call volumes and better service. Unfortunately., however, using the Web as a publishing medium has not resulted in the desired benefits. Indeed, call avoidance has often evolved into "customer avoidance". In particular, most normal users do not want to be "detectives" who have to make a set of guesses about the precise search strings that will get them to the right support solutions. Further, it is quite frustrating for users who cannot solve their problems (by self-service) to then be forced to go through the tedious exercise of later repeating to a support engineer information concerning their self-service attempts. The result is that end users often feel like their vendor is trying to push them away, with the inevitable result that this unintended result may actually occur.

Indeed, studies have shown that, even when a user knows an answer exists to his or her problem, he or she will be able to find the answer only 40% of the time. Further, many "answers" have very complex diagnoses and resolutions that are well beyond the capabilities of most computer users.

The present invention addresses this problem.

BRIEF SUMMARY OF THE INVENTION

Guided self-help is facilitated through use of so-called "active content" pages that are selectively filtered and retrieved as a function of a set of declarative "assertions." An assertion typically is an individual statement or building block of a larger, more comprehensive diagnostic map. An assertions map typically is a smaller, more focused version of a diagnostic map that is executed against a user's computer system to diagnose a particular problem situation that the user has encountered. Active content is Web-based content (i.e., content viewable by a Web browser) that has one or more assertion maps initiated when certain actions are taken (e.g., selecting a link, clicking a button, or the like). A given piece of active content typically has a set of assertions associated therewith.

When a user encounters a technical problem, he or she navigates to a search window and enables a given command when entering a search string to identify fixes for the problem. A server process responds to the search request and downloads an assertion map that checks the state of the end user system and returns results. The server process then processes the conditions, filters content that matches conditions on the end user system, and ranks and displays search results to the relevant active content based on a hierarchy of assertion results.

According to the present invention, a method for automated technical support in a computer system begins by associating a set of one or more assertions with a given piece of active content in an active content library. In response to a user-initiated request, the active content library is searched as a function of answers to questions asked to the user's computer system in the form of assertions.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which:

FIG. 7 is a representative screen display of a self-help: home page that is rendered to the user with a system-supplied self-help search string;

FIG. 9 is a representative screen display of an activated page returned in response to a user's selection of a link in the search results template;

FIG. 10 is a representative screen display of an active self-help results page returned in response to the user selecting a Diagnose option in the activated page of FIG. 9;

FIG. 11 is a representative screen display of an active self-help results page returned in response to the user selecting a Fix option in the activated page of FIG. 9;

DETAILED DESCRIPTION OF THE PREFERRED EMBODIMENT

Figure 1:
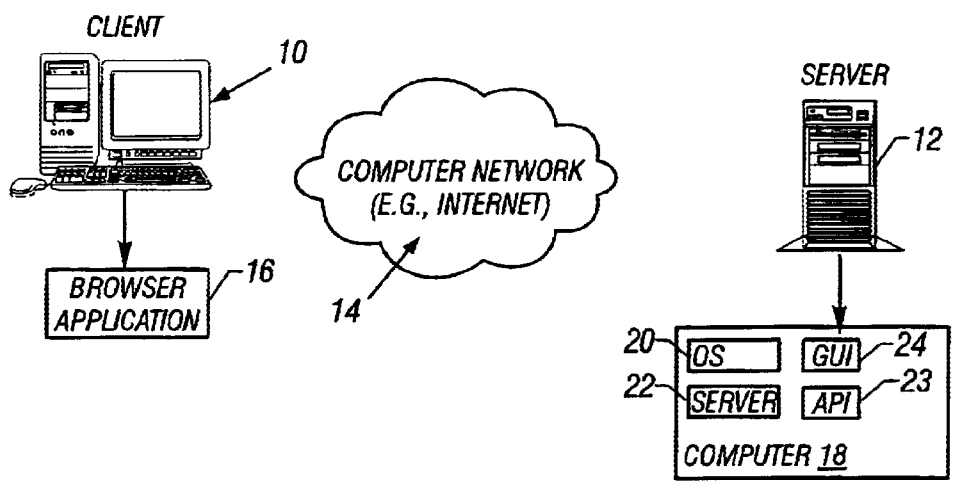
FIG. 1 is a block diagram of a representative Web client and server network environment in which the present invention may be implemented.

The present invention is implemented conveniently in an Internet or Web-based computer network, although this is not a requirement. Thus, by way of background, a representative Web client/Web server is illustrated in FIG. 1. In particular, a client machine 10 is connected to a Web server platform 12 via a communication channel 14.

As will be described, the invention assumes that a user of the client machine 10 has experienced a problem that desires automated technical support. According to the functionality described in Ser. No. 09/216,212, filed Dec. 18, 1999, which application is incorporated herein by reference, the user may attempt to solve the problem through a guided "self-help" process as will be described, or he or she may seek "live-help" from a technical support engineer (SE) located at the server platform (or at some other server), or the user may first attempt self-help and then escalate to live-help as needed.

For illustrative purposes, channel 14 is the public Internet, an intranet, an extranet or any other known network connection. Web server platform 12 is one of a plurality of servers which are accessible by clients, one of which is illustrated by machine 10. A representative client machine may include a Web browser 16, which is a known software tool used to access the servers of the network. The Web server platform supports files in the form of hypertext documents, graphics and other data type objects. The network path to a server (or to a file on the server) is identified by a Uniform Resource Locator (URL), and is well-known.

A representative Web Server platform 12 comprises a Compaq® computer 18 running the Windows NT Operating System 20 and a Web server program 22, such as Netscape Enterprise Server Version 3.51, that supports interface extensions. The platform 12 also includes a display supporting a graphical user interface (GUI) 24 for management and administration, and an Application Programming Interface (API) 23 to enable application developers to extend and/or customize the core functionality thereof through software programs such as servlets, CGI scripts, helper programs and plug-ins.

A representative Web client is a personal computer that is x86-, PowerPC®- or RISC-based, that includes an operating system such as Microsoft Windows '95 or NT, as well as a browser, such as Netscape Communicator (any version) or Internet Explorer (any version), having native support for application plug-ins. The Web client machine is connectable to the Web server(s) via the Internet, an intranet or some other computer network. The Web client browser typically includes a Java Virtual Machine (JVM), which provides a convenient runtime environment for programs written as Java applications or applets.

Although not required, the self-help functionality of related application Ser. No. 09/216,212 is preferably implemented as a Java application or applet (i.e. a set of Java program instructions or code) that is dynamically downloaded to the user's machine for execution. Of course, the self-help application (whether implemented in Java or otherwise) may simply reside on the user's machine. Some of the functionality described herein may be implemented on a server (e.g., as a servlet) and then delivered to the client as needed.

Although the Web client is typically a personal computer, this is not a requirement. The Web client may be any generalized information appliance having a processor, an operating system, optionally a browser application, and a means to connect the device to a computer network from which data may be retrieved. Such appliances include, without limitation, a handheld or palmtop device (e.g., running Windows CE 2.0 or higher), a diskless or so-called "network computer", a set-top computer terminal, or the like.

Figure 2:
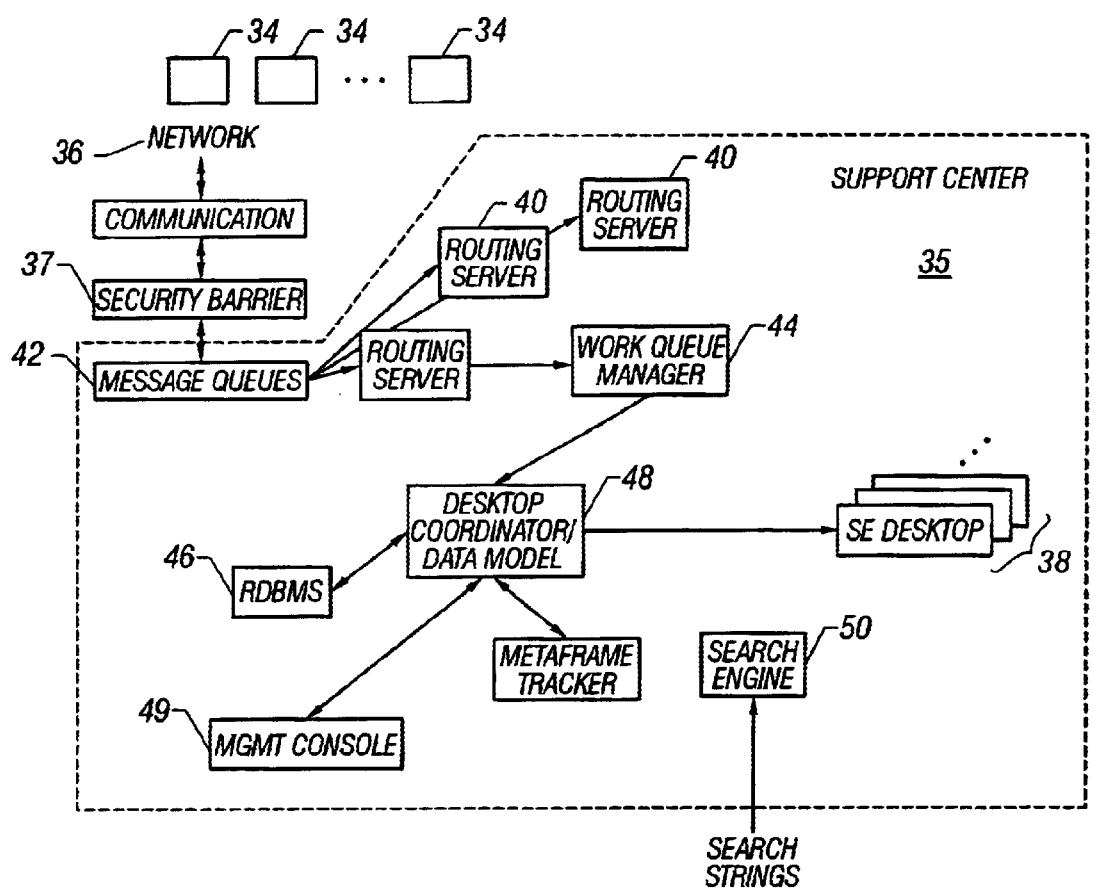
FIG. 2 is a block diagram illustrating the architecture of a technical support chain automation system in which a self-help functionality is implemented.

Although numerous system architectures may be used to implement the following techniques, one such architecture is illustrated in FIG. 2. This architecture is implemented, for example, in a corporate enterprise environment (such as an intranet), wherein a plurality of client machines (desktops) 34 interface with a support center 35 located at a server node through a network 36. The clients are the desktop machines used by the community of application end users. These are the users who use applications, encounter problems, and seek help. Typically, client machines 34 are separated from the network 36 via a firewall 37. Each client machine may include. conventional browser software as discussed above. The server node may have associated therewith a set of one or more support engineer (SE) desktops 38 at which technical support personnel reside.

Under certain circumstances as will be described, a user of a given client machine may undertake to solve a particular problem normally requiring technical support through a self-help (or self-service) process. If necessary, the user also may be placed in contact (e.g., via a voice connection over the telephone, through an on-line Web connection, or the like) with a given technical support engineer. Typically, however, such technical support and service is provided in an automated manner, without necessarily connecting the user/customer to a support engineer via an audio or on-line link. In this environment, given interactions between a user (and, in particular, the user's computer) and an SE may occur without the user's actual knowledge or without any direct communication.

The diagnostic center 35 preferably comprises a number of functional components that are now described. The center includes one or more routing servers 40, and each routing server's primary responsibility is to route a given data set to a best-equipped support engineer to handle the call if live-help is required. To this end, information in the data set preferably is matched up against help desk "rules" to determine which group or person should handle the problem. Preferably, the routing server 40 attempts to assign data sets to a most appropriate message queue 42 (and thus, indirectly, to a most appropriate support engineer). Given support engineers preferably belong to a set of "groups", with each having an associated message queue 42 of assigned data sets. A given support engineer obtains ownership of a given data set from his or her respective queue until the session is complete or the call is reassigned to some other group. A work queue manager 44 is responsible for managing the message queues 42.

In addition to performing routing, communications, and data packaging services, the diagnostic center also supports the server portion of the automated support application. The server portion-comprises a database server (e.g., a commercially available relational database management system (RDBMS)) 46 and an application server 48. A representative RDBMS is available from Oracle, Microsoft or others. The application server 48 provides a set of services to keep the support engineer desktops up-to-date as well as to provide general services to the application back-end. A given server also has (or has access to) a search engine 50 to facilitate searching for known technical support solutions.

Thus, the diagnostic center routes incoming calls (that require live help) to the best call group queue, provides services to the SE desktops, provides services to the support center management console 49, and interfaces to third party products/systems that store configuration data and track results. The management console is a mission control for support center activities. Preferably, the console 49 has both data display and system configuration capabilities. The data displays are both real-time and historic views into the call center metrics, and the configuration dialogs are used to set operational characteristics of the server. A convenient browser-based or other user interface may be used for this purpose.

Figure 3:
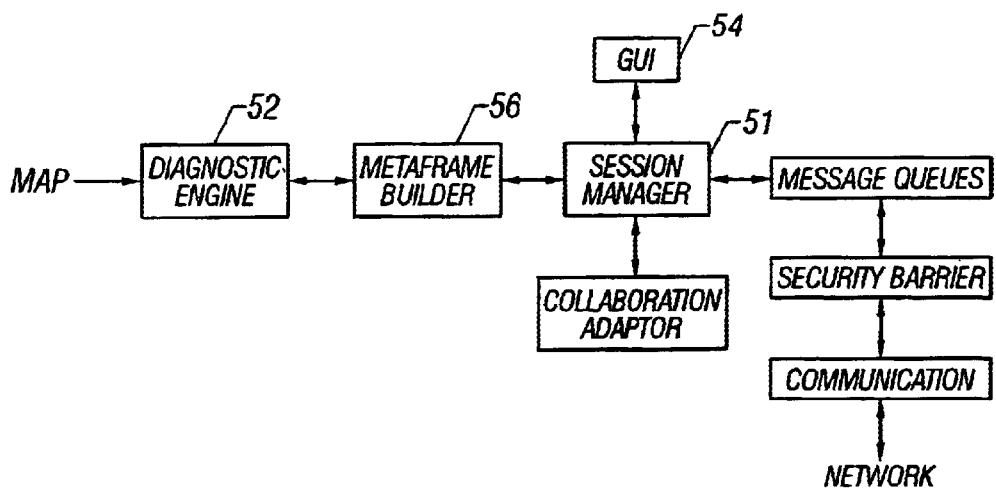
FIG. 3 is a block diagram of the components of the technical support chain automation system implemented on a client machine.

A block diagram of the "client" piece of the automated technical support chain automation system is illustrated in FIG. 3. The client piece executes on the client machine 10 (on which the technical problem has arisen) to perform an initial diagnosis in response to a given occurrence (e.g., a PANIC), to facilitate user self-help (as will be described), to submit the diagnosis to the diagnostic center, and to collaborate with the server components in the center to perform further tests, preferably in an iterative manner, and, if possible, to make repairs. One such iterative distributed problem solving technique is described in Ser. No. 09/073, 464, titled "Method, System and Computer Program Product For Iterative Distributed Problem Solving," assigned to the assignee of this invention. That application is incorporated herein by reference.

The major client components includes a session manager 51, a diagnostic engine 52 and a graphical user interface (GUI) 54. The session manager 51 takes the initial diagnosis (using a diagnostic map), submits it to the server, tracks open problems, and coordinates the flow of information between the client and the support center. The diagnostic engine is a core piece of code that diagnoses problems and collects data as defined by the diagnostic map(s). It cooperates with a data set builder 56 to create data sets, and it works together with the session manager 51 to forward such data sets to the diagnostic center. The client side GUI 54 may be a simple display icon on the user's desktop that is activated when required by the user seeking technical support. The client GUI 54 may also be used to provide dialog boxes or the like to enable the user to monitor and/or interact during a connection with an SE when live help is required.

In the system illustrated in FIGS. 2–3, all communications are made conveniently over TCP networks, but such communications are not dependent on persistent TCP connections. Instead, a single logical session may span multiple TCP connections. A communications subsystem preferably interfaces the client and diagnostic center, managing the input and output queues, and providing basic network location services. In addition, the system may include a security subsystem as network communications should be secure. Thus, for example, a given data set is preferably sealed to restrict access to the data to those having proper credentials. All operations performed on the client machine preferably must first pass security conditions to ensure that only support engineers authorized by the client may inspect of change the client.

Figure 4:
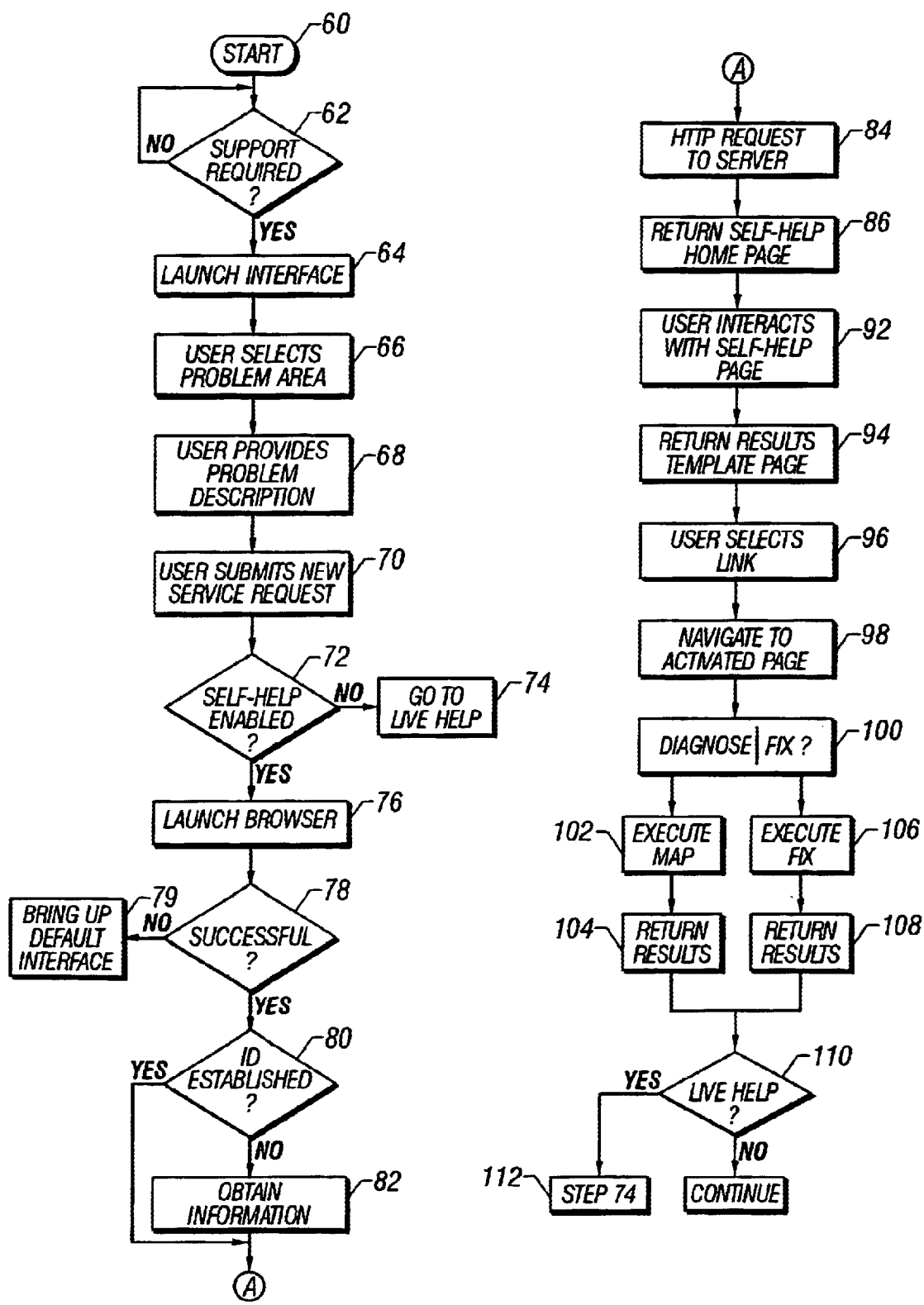
FIG. 4 is a flowchart illustrating a preferred self-help method of automated technical support.

A simplified flowchart showing the self-help technique is illustrated in FIG. 4. In the illustrative example to follow, it is assumed that the user has tried, unsuccessfully, to launch a Microsoft Word application and, instead, he or she has received an error message (e.g., "wwint132. dll error"). The display of this error message has prompted the user to request technical support.

Several of the steps described and illustrated are provided by way of background or context and should not be taken as limiting. The routine begins at step 60. At step 62, a test is run to determine whether the user requires automated technical support. If not, the routine cycles. If, however, the user has indicated his or her request for technical support (e.g., by double clicking an icon in a UI support tray), the routine continues at step 64 to launch the client program code and its associated server interface (sometimes referred to herein as the Motive Assistant™).

Figure 5:
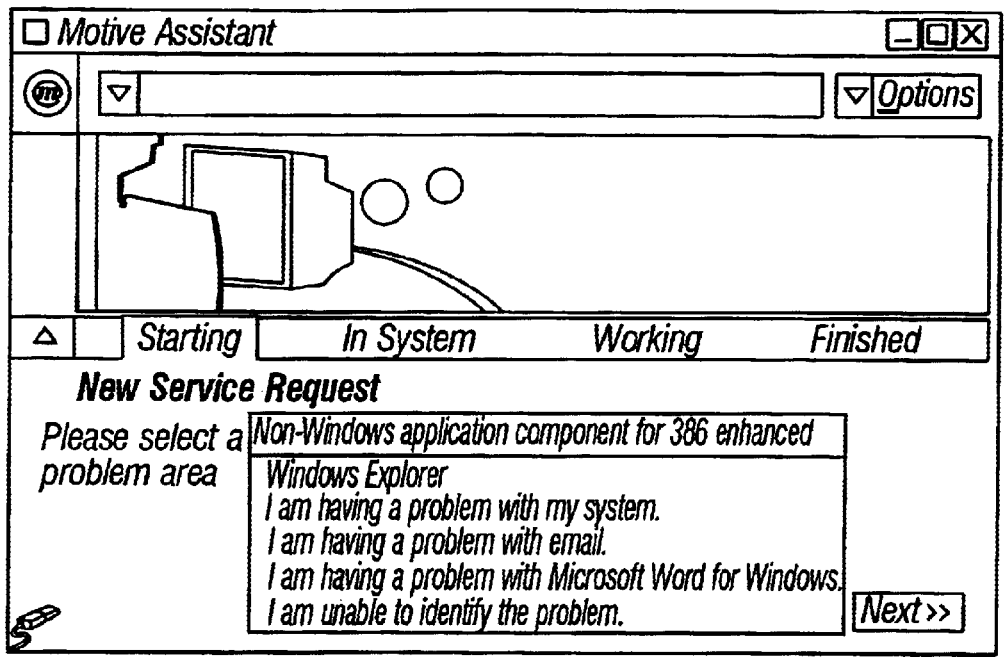
FIG. 5 is a representative screen display of a self-help interface that is launched to initiate an automated technical support session n.
Figure 6:
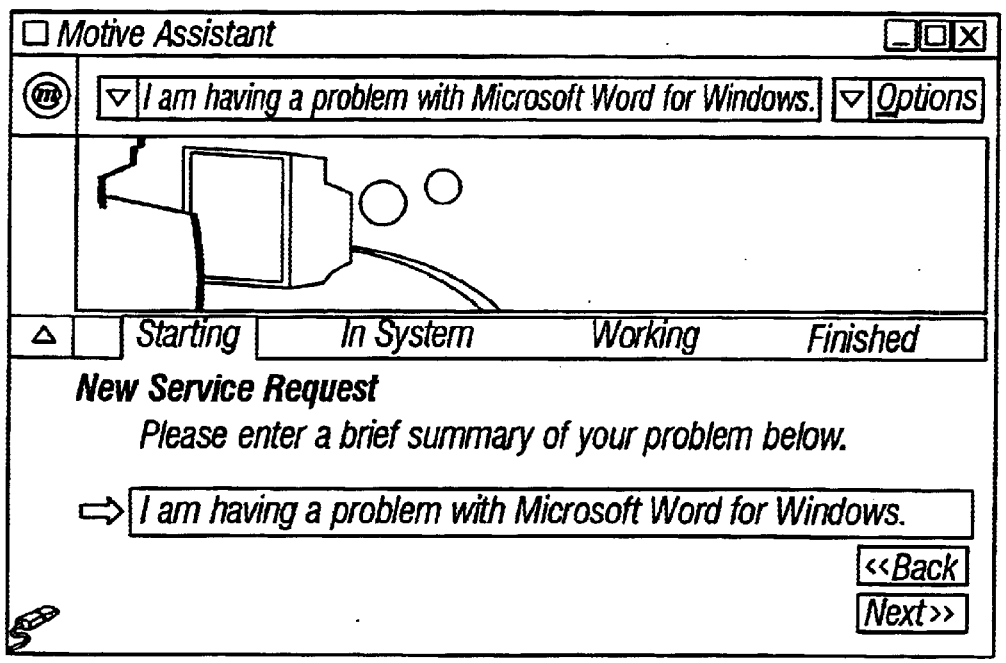
FIG. 6 is a representative screen display panel of the self-help interface.

This operation brings up a technical support interface such as illustrated in FIG. 5. As can be seen, the interface preferably includes a listbox that includes a list of possible "problem areas" that may be selected by the user for a New Service Request. At step 66, the user selects a problem area. At this point, the user may be prompted to provide a brief summary of the problem encountered. This is step 68. An illustrative dialog screen for this step is shown in FIG. 6. Thus, in steps 66 and 68, a problem area and description are entered by the user. These steps may be combined. In the illustrative example, the user is having difficulty starting a Microsoft Word application. At step 70, the user submits the New Service Request with the appropriate information.

A test is then performed at step 72 to determine if the self-help function is enabled. If not, the routine branches to step 74 to provide the current problem to the live-help system (namely, an SE). If, however, the self-help function is enabled, the routine continues at step 76. At this time, the user's default Web browser if launched. A Web browser navigation metaphor preferably is used to provide the user with a comfortable and intuitive interaction with the self-help system, although the self-help UI may be system-configurable. At step 78, a test is performed to determine whether the user's browser has launched. If the outcome of the test at step 78 is negative, the routine skips the self-help process and (at step 78) makes the default interface visible for connecting to live-help.

If, however, the outcome of the test at step 78 is positive, the routine continues at step 80 to test whether the user's identity has been established by the automated technical support system. If not, the routine continues at step 82 to obtain the user's contact information to store such information in a registry. Thereafter, or if the outcome of the test at step is positive, the routine continues at step 84.

In particular, an HTTP request is then made to the automated technical support server. Based on the contact information (as well as other basic parameters such as OS type, values entered by the user in problem submission fields, and the like) passed, the routine then continues at step 86 to serve a self-help home page to the user's default browser. A representative self-help home page, based on the Microsoft Word example previously described, is illustrated in FIG. 7. The home page preferably includes a search field 88 that is populated automatically, namely, by the system itself, by a self-help search string 90. The home page is displayed as a starting point to enable the user to attempt to solve the problem at hand. As can be seen, the home page may include Alerts and Late Breaking Information, a link to a Current Category that the problem is associated with, and a set of SubCategories, each with appropriate links. The home page may also include links 91 to so-called "active content" for the Current Category comprising FAQs, Release Notes, Support Notes, and the like. These links help the user search the existing knowledge base.

Thus, as described in related application Ser. No. 09/216,212, guided self-help is facilitated through use of so-called "active content" pages. Active content is Web-based content (i.e., content viewable by a Web browser) that has one or more diagnostic maps initiated when certain actions are taken (e.g., selecting a link, clicking a button, or the like). In an illustrative embodiment, a given diagnostic map is associated with a page via a URL, although any convenient mechanism may be used to associate a page and a map. When that URL results from selecting a link or button on the Web page, a Web server supporting the support chain automation system has special extensions that recognize it as a map (rather than, for example, a reference to another Web page). The active content functionality enables the user to determine if a particular technical problem described by an external page applies to the user's actual system.

Generalizing, regular HTML-based content is sometimes referred to herein as basic content. It may include FAQs, problem/resolution notes, alerts, how to notes, update notes, as well as other types of support information. "Active content" refers generally to basic content that has been activated with an "activator". An activator is an object that adds intelligence to the basic content. An illustrative activator is a diagnostic map. Active content may also be thought of as basic content that has been activated by attaching one or more diagnostic maps to such content.

Thus, there may be several different types (e.g., FAQ, Alert, Note, etc.) of active content. Existing Web site information and Web site look and feel may be incorporated into the technical support server by editing a set of default active content related templates, one for each type. Active content may link to other Web-based content via URLs to provide full function multimedia support notes, "how to" information, and the like.

Referring now back to FIG. 7, the page is based on the Web browser metaphor and is template-based for ease of configuration. In particular, the diagnostic center may modify the look and feel of the self-help system to match a given theme, layout or motif.

The search string 90 is a value that, when fed into the technical support server's search engine 50, should produce relevant hits, namely, information for solving the technical problem. Preferably, information served in response to execution of the search string depends on a given audience to which the user belongs. In the preferred embodiment, the search string is generated dynamically through the use of a diagnostic map that executes on the client machine. The diagnostic map examines the client system (including the existing applications, registry information and the like) and communicates with the technical support server to derive the search string as a background task, namely, without user input. A given diagnostic map is a programmable, reusable object that allows a technical support engineer (SE) or the others to write custom tools for diagnosing problems.

Although not illustrated in FIG. 7, it should be appreciated that, in some instances, execution of a diagnostic map run during the self-help process produces a self-help answer ("you have problem x") or a self-help URL (or series of URLs) that the user should probably investigate. It should also be noted that the notion of a diagnostic map preferably is not surfaced directly to the user. During the execution of a given map, however, the user may be asked if he or she desires to check for a particular problem, apply a patch, or the like).

Figure 8:
FIG. 8 is a representative screen display of a search results template that is generated in response to a user's activation of a search.

Returning to FIG. 4, at step 92, the user interacts with the self-help page by navigating the default browser. In this illustrative example, the user launches the search that has been proposed by the system. Alternatively, the system may launch the search automatically for the user. At step 94, the routine returns a results template page that, in this example, identifies a Support Note link. A representative results template page is shown in FIG. 8. In this example, the page identifies a Support Note that describes the user's problem (namely, the inability to start Microsoft Word). and the associated error message that prompted the user to initiate the session in the first instance. As noted above, preferably the search results returned only include content written for the end user's audience.

Based on the clear relevance of the Support Note, the user selects the link. This is step 96. Upon activation of the link, the routine continues at step 98 to navigate the browser to a so-called "activated page" as illustrated in FIG. 9. A page is said to be activated because it may include active content. As illustrated, the activated page provides the user an option to further diagnose the problem, by selecting a Diagnose button, and/or the option to apply a fix to the problem, by selecting a Fix button. Each of these options has associated therewith additional explanatory text to facilitate the user's selection. At step 100, a test is performed to determine whether the user has selected the to Diagnose or to Fix.

The routine branches to step 102 if the user selects Diagnose to execute another diagnostic map. At step 104, the routine then returns and populates a self-help results page such as illustrated in FIG. 10. This page includes appropriate text identifying whether or not the user's system does, in fact, have the problem identified. It may also include related links and information as illustrated. The user may then navigate to the related links and other information.

Alternatively, the routine branches to step 106 if the user selects Fix and executes the required fix. At step 108, the routine returns a self-help results page populated with information confirming the action. Given the previous Microsoft Word example, the self-help results page returned is illustrated in FIG. 11. This page, likewise, may include related links and information.

The self-help results page (in either case) may include a link to live-help. Thus, at step 110, the routine tests to determine whether live-help is requested. If so, the routine branches to step 112 and establishes a live SE connection; otherwise, the routine continues processing the self-help function. This completes the processing.

The technical support system may interact with the user's local machine to execute diagnostic maps using a "mini Web server" process running on the client. Thus, for example, the execute map step 102, among others, may be implemented in this manner. One preferred method for executing a map locally from the client browser begins by sending a special URL to the local mini Web server. The local process authenticates the user, breaks apart the URL to determine which map to run, checks to see if the map is present (and, if not, downloads the map from the system server), "executes" the instructions of the map, collects the resulting XML, and then parses the XML looking for self-service tags to be used for further navigation purposes. Thus, for example, the tags enable the user to navigate to a page that describes the problem or to how to fix the problem. This process is also used to generate the system-supplied search string.

Assertions

As an active content repository increases in size, it is desirable to provide techniques for assisting the user to find relevant content. According to the present invention, this result is achieved by associating a given piece of active content with a set of one or more assertions. An assertion is a fragment of a diagnostic map. A set of assertions comprise a given diagnostic map, and a guided self-help system provisioned according to the invention may comprise thousands of assertions. Assertions enable the system to more intelligently filter support content based on information gathered from the end user system. Filtering content in this manner enhances the self-service environment by automatically narrowing the amount of information that is surfaced to the user, just as a search engine filters the most appropriate results for a search request. Preferably, a large number of assertions are defined on a self-service site based on problems areas that are reported most frequently by customers.

With respect to a piece of active content, a given assertion may evaluate in one of three ways: false, the assertion evaluates to false; true, the assertion evaluates to true; or DC, don't care, the value of the assertion does not matter. A given piece of active content may then be considered a valid prospect for a problem resolution if all of the assertions for the piece (namely, all fragments of the diagnostic map) evaluate to a given condition, e.g., true. As will be seen, assertions enable more relevant hits of content to be surfaced to a content user.

According to the present invention, an assertion is typically a simple expression, such as the following illustrative examples: system is running NT with service pack4; application Microsoft Excel is installed; library DLL msbigdud-.dll is missing or corrupt; Outlook and Internet Explorer 4.0.1 are installed (which could be two separate assertions if desired); registry key KHLM/Software/Motive/debugLevel is set to verbose; available system drive diskspace is less than 1 Mb, and so on. An assertion may also be a well-defined sequence of map commands that produces a boolean answer. Thus, for example, if there are a set of eight assertions identified as a1, . . . a8, a complex assertion expression may be designed as follows: (a1 OR NOT a2) AND (a6 OR a8). Alternatively, an assertion can be created for each complex term. Thus, one might have assertions a6 and a8, and then later define assertion a29 that evaluates to the term (a6 OR a8). Although this adds to the total number of assertions in the system, it may simplify the selection of assertions as well as their implementation.

Thus, according to this aspect of the present invention, a given diagnostic map may be consider to comprise a number of individual reusable assertions, wherein an assertion is a fragment or "maplet" of a diagnostic map. A map is generated from the list of known assertions, and it is executed at an appropriate time on a user's system such that the vector of assertion answers can be fed as input into the self-service engine operative on the web server. Based on the assertion answers and the relationship of the assertions to the active content repository, a more relevant set of active content should result when the search is conducted against a large active content repository. In particular, the result is effectively a search of the active content repository based as a function of the answers to questions asked to the user's system in the form of assertions.

Assertions may be created and organized in certain categories around which a given support site is organized. These categories include, for example, vendor-related issues, hardware or software problems, and so on. Preferably, assertions are written with a user's search requirements in mind to facilitate exposing the most relevant content to the user and to increase the likelihood that the user will find the information he or she needs.

Figure 12:
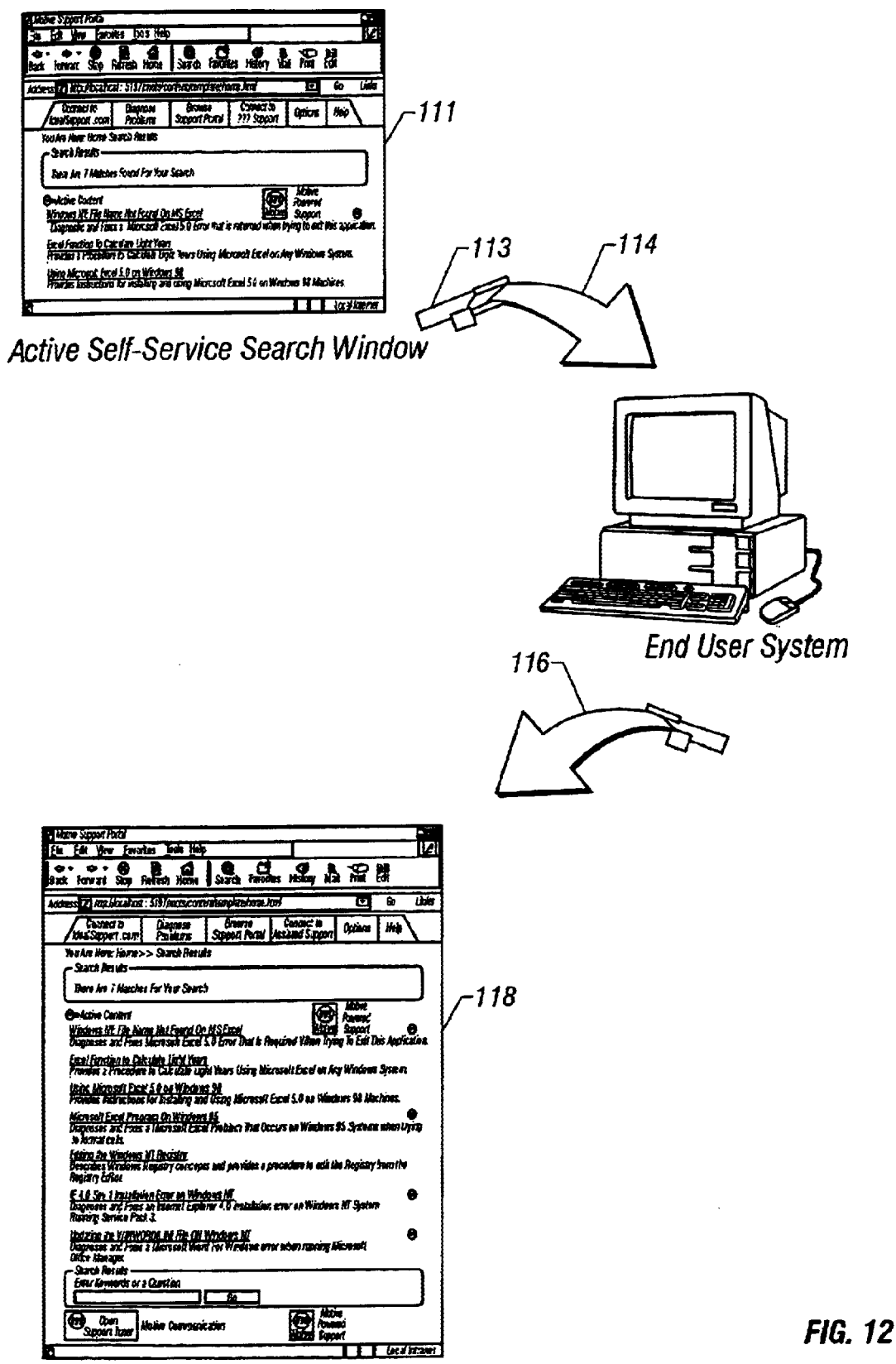
FIG. 12 illustrates how assertions are used to gather information from the end user system and to filter content.

Assertions are developed and may be used in much the same way as maps. Thus, for example, FIG. 12 illustrates how assertions are used to gather information from the end user system and to filter content. In this illustration, a user navigates to a search window 111 and enables a given command (e.g., Use my system data) when entering a search string. The server 113 at the diagnostic center then downloads an assertion map 114 that checks the state of the end user system and returns results 116. The server 113 then processes the conditions, filters content that matches conditions on the end user system, and ranks and displays the search results 118 based on a hierarchy of assertion results.

The following is a more concrete example of the technique for creating and using assertions according to the present invention. For the purposes of illustration only, it is assumed that the support problem at issue involves Microsoft Excel and, in particular, a problem that occurs on Windows NT systems if a Registry key value is not enabled. After fixing this problem individually for several customers, it is assumed that a decision is made to make the solution available from a self-service site so that multiple customers can find and independently resolve the problem. To the end, a content page is added to an active content library. The page documents the problem and includes a map to automatically check and fix the Registry setting.

In addition to this active content library entry, it is assumed that the content library contains several other items that provide solutions for Microsoft Excel software running on a Windows NT system. Although all of this information is useful, the end user who needs information about a specific Microsoft Excel problem will benefit most from a support site that presents precise content about the problem he or she has encountered. Assertions are used for this purpose. In particular, to facilitate the search for specific content, a number of well-defined assertions are associated with entries in the active content library as described below. When the user initiates a search, these assertions are then used to identify the state of the user's system and ultimately narrow the search results more efficiently to the desired information.

Continuing with the above example, an assertion author may take the following parameters into account when creating assertions to filter content for the described Microsoft Excel problem:

Is the user's machine a Windows NT system? The described problem only occurs when quitting out of Microsoft Excel for Windows NT—an assertion must check that the operating system type is Windows NT.

Is version 5.0 of Microsoft Excel installed? The problem occurs with version 5.0 of Microsoft Excel—an assertion must check if version 5.0 of this application is installed.

Is the Registry setting configured as required? The problem occurs if the long filenames setting is disabled in the Registry—an assertion must check if this setting is disabled.

Does the user's login name exceed eight characters? The problem occurs if the end user has logged on to the system with a user name that exceeds eight characters—an assertion must check the length of the login name. As will be seen, during a search of the active content, the server ranks each content page based on how many conditions are met by assertions associated with that page. Pages for which all conditions are true are ranked higher than ones in which conditions are mostly true and so on. The server may ignore pages for which some or all assertion conditions are false. By specifying assertions to check very specific conditions, the above-described technique provides the end user with access to precise information without having to wade through dozens of entries that may or may not apply to his or her environment or situation.

The following describes how to create assertions for each of the illustrative parameters defined above and how support content is systematically filtered from the content library. For the purposes of simplifying this description, this scenario assumes that the active content library contains a set of ten items as identified in the screen display of FIG. 13. In this example, assertions are applied to each entry in this active content library based on attributes that must match conditions on the user's system for a particular page to be filtered. For example, for illustrative purposes only, the first item in this list, "IE 4.0 Sev 1 Installation Error on Windows NT", is tagged with two assertions: the first to check if Windows NT is installed on the end user machine, and the second to check if version 4.0 of Internet Explorer is installed. When the end user initiates a search, the server downloads a map that contains these two assertions. If both assertions return a true value, "IE 4.0 Sev 1 Installation Error on Windows NT" is ranked and displayed on the search results page. If only one assertion is true, and the other assertion was not evaluated (e.g., its value is "don't care"), this content page is ranked and displayed after other content that is more applicable. Alternatively, the page is not displayed at all (e.g., because at least one of its assertions resolved as false). If both assertions return false, the page is not displayed in the search results.

Figure 13:
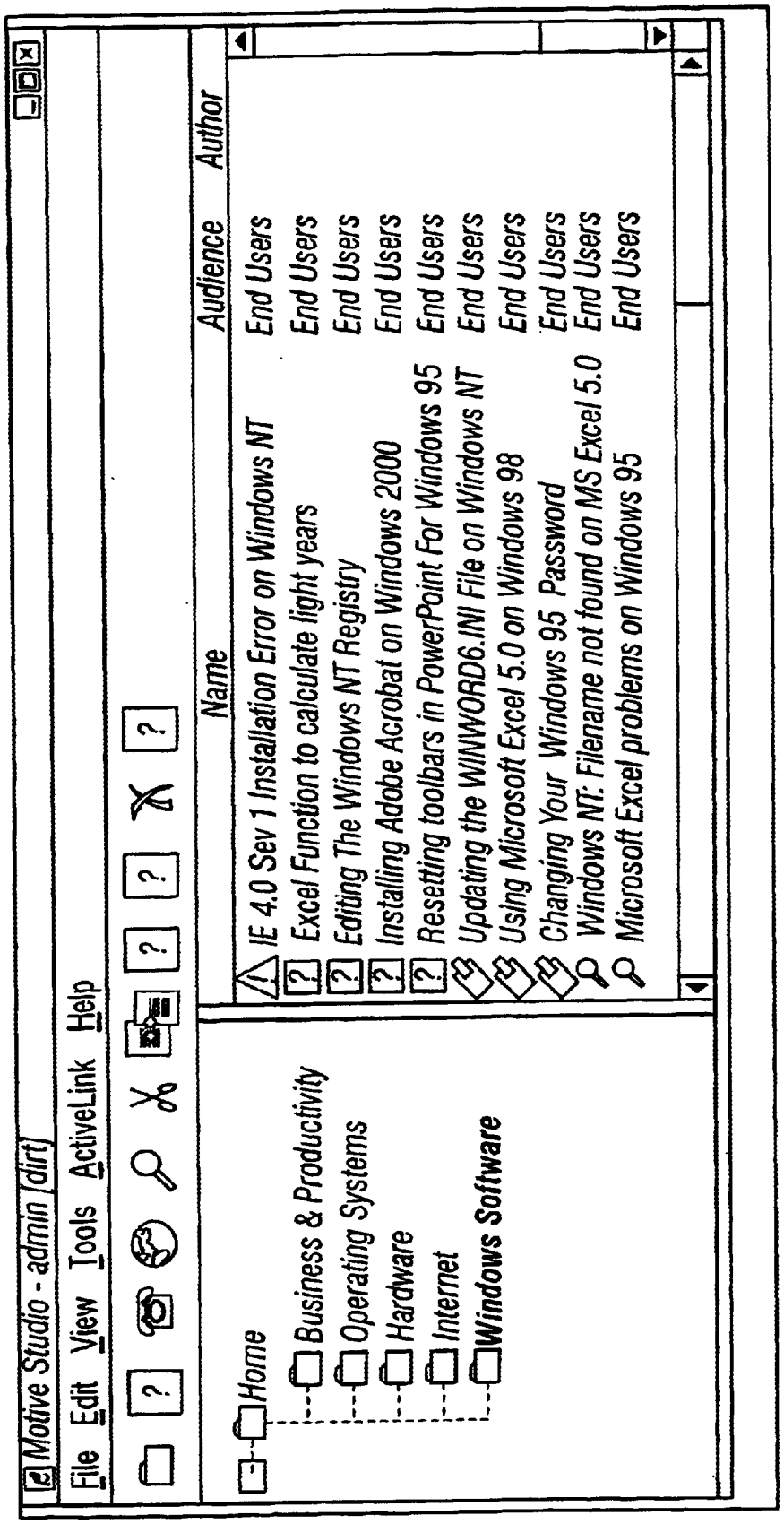
FIG. 13 illustrates a screen display listing the contents of an active content library.

Given the listing of FIG. 13, each item in the Windows Software directory is tagged with one or more assertions that define characteristics of the content page, such as the following:

| | Item in Content Library | Assertions Applied to Item |
|---|---|---|
| (1) | IE 4.0 Sev 1 Installation Error on Windows NT | IsWinNT |
| (2) | Excel function to calculate light years | IsWinNT, IsExcel50 |
| (3) | Editing the Windows NT Registry | IsWinNT |
| (4) | Installing Adobe Acrobat on Windows 2000 | Others |
| (5) | Resetting toolbars in PowerPoint for Windows 95 | Others |
| (6) | Updating the WINWORD6.INI file on Windows NT | IsWinNT |
| (7) | Using Microsoft Excel 5.0 on Windows 98 | IsExcel50 |
| (8) | Changing you Windows 95 password | Others |
| (9) | Windows NT: Filename not found on MS Excel 5.0 | IsWinNT, IsExcel50, IsLongFilenameEnabled, LoginNameExceeds8 |
| (10) | Microsoft Excel problems on Windows 95 | IsExcel50 |

As can be seen, the second to last content entry provides the solution to the Microsoft Excel problem described earlier. Ideally, this page should be displayed at the top of the search results so that the user can quickly access information about this problem.

The ISWinNT assertion checks to see if the end user system is running Windows NT. The following code calls the IsWindowsNT command and assigns a true value to a SetAssertionResult command if the condition is met.

If (IsWindowsNT)

SetAssertionResult (true)

Content pages providing Windows NT information then surface if the following search requirements are met: the ISWinNT assertion has been applied to the page, and the ISWinNT assertion returns a true value after verifying the end user machine is a Windows NT system. The IsWinNT assertion is applied to content entries 1, 2, 3, 6, and 9 in the active content library because each of these entries provides information about using software on a Windows NT system. As noted above, an entry in this subset is displayed based on its ranking in the final list of applicable content.

The IsExcel50 assertion checks if version 5.0 of Microsoft Excel is installed on the user's system. The following representative code may be used to evaluate this assertion.

```
SystemApi = GetApi ("System.Api")
verifyApp = "Microsoft Excel"
verifyVersion = "5.00"
instapps = SystemApi.GetInstalledApps ( )
appslist = instapps.GetEntities ( )
appFound = false
while ( ! appFound && appslist.hasMoreElements ( )
    {
    item = appslist.nextElement ( )
    prodName = item.GetAttribute ("productName")
    appVer = item.GetAttribute ("productVersion")
    if ((prodName.equals (verifyApp) &&
    appVer.equals (verifyVersion))
```

```
SetAssertionResult (true)
}
```

The IsExcel50 assertion is applied to content entries 1, 9, 7, and 10 in the library because each of these entries provides information about Microsoft Excel, version 5.0. An entry in this subset is displayed depending on its ranking in the final list of applicable content.

The IsLongFilenameEnabled assertion checks if the long filename setting is enabled in the Registry. This requires the Win31FileSystem Registry value in the HKLM\\SYSTEM\\CurrentControlSet\\Control\\FileSystem key to be set to 0.

longfilename=CheckRegistryValue (
"HKLM\\SYSTEM\\CurrentControlSet\\Control\\FileSystem",
"Win31File System", "0")
    if (longfilename==0)
    SetAssertionResult (true)

The IsLongFilenameEnabled assertion is applied to the second to last content entry in the active content library because this entry specifically addresses the Registry setting that affects the use of long filenames.

The LoginNameExceeds8 assertion checks if the user's name is longer than eight characters in length using the following logic.

geninfo=SystemApi.GetGeneralInfo ( )
    verifyName=genInfo.GetAttribute ("currentUser")
    if (verifyName.length ( )<=8)
    SetAssertionResult (true)

The LoginNameExceeds8 assertion is also applied to the second to last content entry in the active content library.

Figure 14:
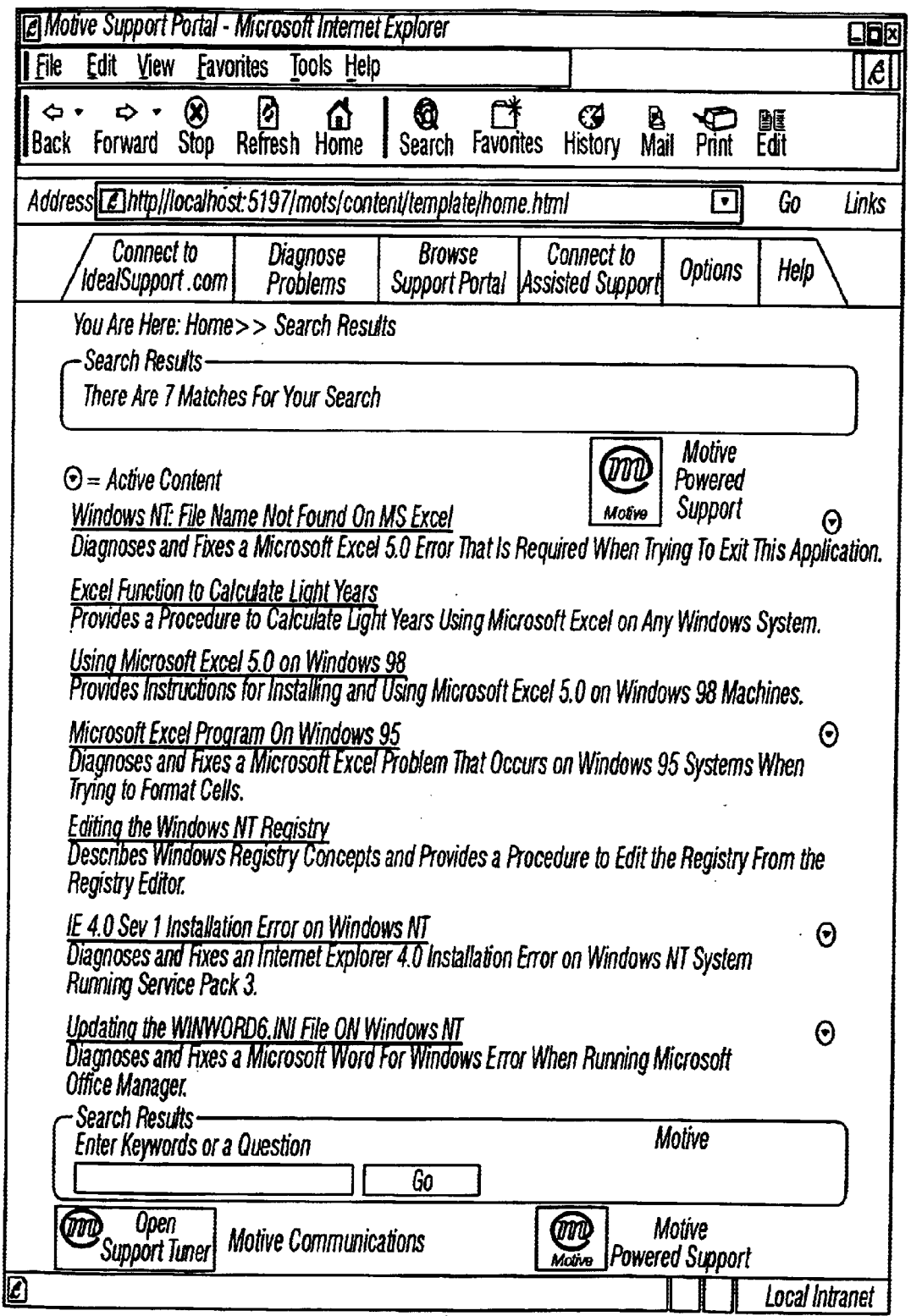
FIG. 14 illustrates the search results page that is derived from executing an assertion map derived from the contents of the active content library.

Thus, according to this illustrative example, if a user elects to resolve a problem by selecting a "use my system data" option when entering a search string to locate information about the Excel problem he has encountered, the server creates an assertion map containing all assertions defined in this active content library, runs the assertion map on the end user system, receives the return value from the SetAssertionResult command defined for each assertion, and then ranks and filters all assertions that have returned a true return value. Optionally, entries that have some assertions true and some false are not listed at all. Based on the assertions defined above, the search results (for this particular example) are then displayed as shown in FIG. 14. As can be seen, the results of this search are ranked according to relevance to the user's particular system. In this case, the user sees the "Windows NT: Filename not found on MS Excel 5.0" content entry first, because all assertions that are attached to this content have returned as true. The user can then immediately access this content entry to learn about and fix the specific Microsoft Excel problem he has encountered. This completes the description of the above-identified Microsoft Excel problem.

Preferably, assertions may be created when active content is generated or edited. Thus, for example, when editing active content, a GUI display panel may be used to provide an area for the selection of assertions. The author can select from the list of all assertions any assertion desired or create a new assertion, and then specify if the assertion should be true or false. By default, if an assertion has not been associated with a specific piece of content, the relationship is DC.

An algorithm for generating an assertion map is set forth below. Logically, the map code sequence for each assertion can be concatenated together, and the result is the assertion map. The order of assertion execution should not matter. The following pseudocode fragment describes how an assertion map is built:

```
// global declarations that can be used by
assertions
// implementations of global function
SetupForAssertExecution ( );
// building up assertion code
for each assertion a in map; do
    BeforeAssertion (a);
    // user assertion code goes here
    insertAssertionCode (a);
        AfterAssertion(a);
    done
// end of script
AssertionExecutionComplete ( );
    The format of the XML generated by the assertion map
code sequences is well-defined. It will look as follows:
<Assertions>
[001b]<Assertion id=[assertions-id] value=[true or false]
           label=[assertion-label]>
        [optional additional detail area]
    </Assertion>
    <Assertion id=. . .
    </Assertion>
</Assertions>
```

The optional additional detail area of the assertion output XML can be used. by the map code sequence of the assertion to save more verbose relevant data that has to do with how the assertion value was calculated. The detail can be used later by a support analyst (following escalation to live help or otherwise) if required for added level of detail. The end user, of course, just wants to know the answer to his or her specific problem, but the support analyst might get some added value out of the specifics of the detail.

The following is an example output for a few assertions (the code that produced this XML is set forth below):

```
<displayGroup TITLE="Assertions">
    <Assertion>
        <ID>1</>
        <label>OS is Windows NT</>
        <value>1</>
    </>
    <Assertion>
        <ID>2</>
        <label>Win.INI file exists</>
        <value>1</>
        <FileExists>
            <relativePath>win.ini</>
            <path>C:\WINNT\win.ini</>
            <DIRID>10</>
        </>
    </>
    <Assertion>
        <Id>3</>
        <label>Internet Explorer Untrusted Scripted
        Paste Vulnerability</>
        <value>0</>
        <RegistryValue>
            <parentKey>HKLM\SOFTWARE\Microsoft\Windows
            \CurrentVersion\Internet Settings</>
            <valueName>MinorVersion</>
            <value>; SP1;</>
            <description>Registry Value
            HKLM\SOFTWARE\Microsoft\Windows\CurrentVer
            sion\Internet Settings -
```

```
        </>
      </>
   </>
```

Preferably, the above XML code is only sent to the server in the case of a live-help escalation. The assertion search engine that resides on the web server only cares about the assertion answers, so a compact representation of the assertion answer vector may be used here.

The following assertion map was used to build the above XML output, and it is shown here merely to provide a general idea of what an assertion map may look like. The sections in bold show what the author has to enter to define each assertion:

```
// generated assertion map
// [001b]global declarations that can be used by
assertions
// these variables can be used by each assertion
var v:      // the value used for each assertion
computation
var e:      // the XMLEntity for each assertion
var False = "0";         // the assertion is False
var True = "1";          // the assertion is True
var DC = "1";            // the assertion value is Don't
Care/Know
// this function does the setup before an assertion
code block is executed
function BeforeAssertion(id, label) {
    e = CreateXMLEntity ("Assertion");
    e.AddAttribute ("Id", id);
    e.AddAttribute ("label", label);
    v = null;
}
// this function does the bookkeeping after an
assertion code block is executed
function AfterAssertion(v) {
    if (v)
        av = True;
    else
        av = False;
    e.AddAttribute ("value", av);
    LogXMLEntity(e);
}
BeginDisplayGroup ("Assertions");
// assertion 1
BeforeAssertion("1", "OS is Windows NT");
// user assertion code
v = ISWindowsNT( )
// end user code
AfterAssertion(v);
// assertion 2
BeforeAssertion("2", "Win.INI file exists")
v = null;
// user assertion code
fapi = GetApi("FileApi")
fe = fapi.FileExists("win.ini", 10)
e.AddEntity(fe)    // adds extra data for SE use
v = !fe.IsInteresting( )
// end user code
AfterAssertion(v)
// assertion 3
BeforeAssertion("3", "Internet Explorer Untrusted
Scripted Paste Vulnerability")
// user assertion code
RegApi = GetApi("RegApi")
key =
"HKLM\\SOFTWARE\\Microsoft\\Windows\\CurrentVersion\
\Internet Settings"
vXml = RegApi.GetValue (key, "MinorVersion")
e.AddEntity(vXml);
version = vXml.GetAttribute ("value");
if (version = null) {
    idx = -1;
} else {
    idx = version.indexOf(";3214;")
}
if ((idx != -1)
    && (CheckFileVersions ("advpack.dll",
        "4.72.3610.1500", "4.72.3610.1500", 11) = 0)
    && (CheckFileVersions ("Mshtml.dll",
        "4.72.3612.1700", "4.72.3612.1700", 11) = 0)) {
    v = true;
} else {
    v = false;
}
// end user code
AfterAssertion(v);
// end of assertion map
EndDisplayGroup ( )
```

Assertions provide several technical advantages. As has been described, an assertion is a building block of a more complex diagnostic map. When a given piece of active content is created, it can have a property that is, in effect, a list of one or more assertions. The active content will then be a valid prospect for a problem resolution if all (or some given number of) the assertions in the list evaluate to a given condition (e.g., true). As has been shown, a search using assertions provides a much more directed analysis that is likely to include only relevant hits for the specific problem being encountered. This allows the diagnosis and repair to be effected quickly and more reliably. In particular, assertions help the end user get to the right active content faster. The use of assertions in the automated technical support system thus provides immediate content library searching benefits.

Several variants are within the scope of the present invention. Thus, for example, an assertion may be a question that is posed to the end user (e.g., via a web page) and that the user must answer via a dialog. In the preferred embodiment described above, an active content page is served up as a hit if all of the assertions associated with the page have the correct boolean value. As described above, if only a subset of the assertion answers are true, then a page may still be returned but with a lower ranking. If only a subset of the assertion answers are known, however, it is within the scope of the present invention to perform only a partial search. As another alternative, a combination of keyword and assertion search techniques might be desirable. For example, one might want to do a text search on only content that contains a keyword and for which a specific assertion is false. It may also be desirable to generate maps that can evaluate a collection of assertions. These and other such variations are all considered to be within the scope of the present invention.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

Having thus described our invention, what we claim as new and desire to secure by Letters Patent is set forth in the following claims.

What is claimed is:

1. A method for automated technical support in a computer enterprise comprising:

in response to a user-initiated technical support search request for information related to a problem with a first computer system corresponding to a user's machine, downloading a program from a second computer system and executing the program to gather data from the first computer system, wherein the data comprises a first set of assertions about the first computer system;

receiving the first set of assertions at the second computer system;

comparing at the second computer system the first set of assertions to respective sets of assertions associated with active content in an active content database; and transmitting to the first computer system some but not all of the active content from the active content database in response to comparing the first set of assertions to the respective sets of assertions, wherein a given piece of active content is transmitted when the comparing indicates that the given piece of active content pertains to diagnosing the problem with the first computer system.

2. The method as described in claim 1 wherein the active content is basic content that has been activated with an activator.

3. The method as described in claim 2 wherein the basic content is selected from a content group comprising at least one of the following:

FAQs, release notes, and at least one URL to a Web technical support reference.

4. The method as described in claim 1 wherein an assertion is a declarative statement about a state of a computer system.

5. The method as described in claim 1 wherein the program comprises a set of concatenated assertions.

6. The method as described in claim 1 wherein a given assertion evaluates to a given condition.

7. The method as described in claim 1 wherein the given condition is selected from a set of conditions consisting of true, false and don't care.

8. The method as described in claim 1 further including the step of ranking the active content as a function of a number of the respective set of assertions associated with the active content that evaluate to a given condition.

9. A method for automated technical support in a computer enterprise comprising:

responsive to a user-initiated request for technical support related to a problem with a first computer system corresponding to a user's machine, searching an active content library for active content related to diagnosing the problem, wherein a given piece of the active content in the active content library is associated with a first set of one or more answers to a first set of one or more questions, wherein the first set of one or more answers indicates a respective problem;

downloading a program from a second computer system to gather a second set of answers to a second set of questions from the first computer system;

executing the program to produce the second set of answers;

transmitting the second set of answers to the second computer system, wherein the second computer system performs the searching of the active content library as a function of the second set of answers to the second set of questions.

10. The method as described in claim 9 wherein a given answer describes a characteristic of a computer system.

11. The method as described in claim 9 wherein the program comprises an assertions map.

12. The method as described in claim 9 wherein the active content is basic content that has been activated with an activator, wherein the basic content is selected from a content group comprising at least one of the following:

FAQs, release notes, and at least one URL to a Web technical support reference.

13. A method for automated technical support in a computer system comprising:

generating an assertions map for use in searching a content library by:

downloading a program including assertions from a server to a user's computer system;

executing the program to gather data from the user's computer system for producing the assertions map;

obtaining the assertions map at the server;

searching the content library using the assertions map, wherein the searching is performed by the server; and returning to the user's computer system active content in the content library that satisfies a given condition.

14. The method as described in claim 13 wherein the given condition is that all of a set of assertions associated with the active content evaluate true.

15. The method as described in claim 13 wherein the given condition is that at least some of a set of assertions associated with the active content evaluate true.

16. The method as described in claim 13 wherein the content library is searched in response to a user-initiated search request.

17. An automated technical support system in a computer network, comprising:

a database of active content, wherein a given active content entry in the database has a set of one or more assertions associated therewith, wherein the set of one or more assertions is related to a technical support problem; and a process responsive to a user-initiated request for searching the active content database as a function of answers to questions evaluated by a program downloaded from a server to a user's computer system in the form of assertions, wherein the answers are gathered from the user's computer system by executing the program, and the answers are obtained by the server for performing the searching.

18. The automated technical support system as described in claim 17 wherein the active content is basic content that has been activated with an activator, wherein the basic content is selected from a content group comprising at least one of the following:

FAQs, release notes, and at least one URL to a Web technical support reference.

19. A method for automated technical support in a computer enterprise comprising:

in response to a request for information related to a problem with a first computer system, downloading a program related to the problem from a second computer system and executing the program to gather data from the first computer system, wherein the data include a first set of assertions about the first computer system;

receiving the first set of assertions at the second computer system;

comparing at the second computer system the first set of assertions to respective sets of assertions associated with a plurality of active content entries in a content database; and providing to the first computer system a given active content entry of the content entries when the comparison indicates that the respective set of assertions associated with the given active content entry meets a condition with respect to the first set of assertions about the first computer system.

20. The method of claim 19 wherein the condition indicates that the first set of assertions and the respective set of assertions associated with the given piece of active content are the same.

21. The method of claim 19 wherein the condition indicates that the first set of assertions includes a given number of the respective set of assertions associated with the given piece of active content.

22. A method for automated technical support in a computer enterprise comprising:

in response to a request for information related to a problem with a user's machine, downloading a program related to the problem from a server and executing the program to gather data from the user's machine, wherein the data include a first set of assertions about the user's machine;

receiving the first set of assertions at the server;

comparing the first set of assertions to respective sets of assertions associated with a plurality of entries in a content database; and returning to the user's machine a given entry of the entries when the comparison indicates that the respective set of assertions associated with the given entry meets a condition with respect to the first set of assertions about the user's machine.

23. The method of claim 22 wherein the condition indicates that the first set of assertions and the respective set of assertions associated with the given entry are the same.

24. The method of claim 22 wherein the condition indicates that the first set of assertions includes a given number of the respective set of assertions associated with the given entry.

* * * * *